Patented Oct. 4, 1949

2,483,855

UNITED STATES PATENT OFFICE 2,483,855

BIOCHEMICAL PROCESS FOR THE PRODUCTION OF RIBOFLAVIN

Hugh R. Stiles, St. Mary-of-the-Woods, Ind., assignor to Commercial Solvents Corporation, Terre Haute, Ind., a corporation of Maryland No Drawing. Application March 16, 1942, Serial No. 434,901

24 Claims. (Cl. 195—35)

My invention relates to a process for the biochemical synthesis of riboflavin; also, commonly called Vitamin $B_2$. More particularly, it concerns the production of riboflavin by the fermentation of nutrient mashes containing protein with a fungus known as *Eremothecium Ashbyii*.

The above-mentioned organism has previously been known to synthesize riboflavin from solid media containing carbohydrate and protein. These media contained glucose as the carbohydrate, and peptone and beef bouillon as the protein source. The yields of riboflavin thus produced, however, were relatively small, and in general it required approximately three weeks to secure such yields. In some instances, considerably longer periods of time were required. With liquid media, such as those of the peptone-glucose type, the yields of riboflavin were far inferior to those obtained where solid media were utilized.

I have now discovered that riboflavin can be synthesized in relatively large amounts, greatly increased yields, and in a much shorter period of time, by the fermentation of sizable volumes of liquid nutrient mashes containing proteins, with the fungus *Eremothecium Ashbyii*. Such very favorable and unexpected results are brought about primarily by maintaining the mash in a high degree of aeration during the fermentation.

In carrying out my invention, a mash having a predetermined pH and possessing the desired nutrients, together with the necessary mineral salts, is fermented with the fungus *Eremothecium Ashbyii*, under pure culture conditions. During the period of fermentation, sterile air is introduced in a manner such that the fungus and the air are substantially completely dispersed throughout the mash. In order to avoid any possible contamination from the atmosphere during the fermentation, a positive operating pressure is preferably maintained over the surface of the mash. Toward the conclusion of the fermentation, the mash generally assumes a characteristic greenish or yellowish tint, the pH usually being slightly on the alkaline side, ordinarily from 7.1 to 8.3. Recovery of the riboflavin thus synthesized is facilitated by heating the spent mash; however, in view of the fact that alkaline solutions of riboflavin are unstable to heat, the pH of the mash is adjusted to a value of around 5.5 prior to this heat treatment by the addition of the required amount of a suitable acid such as concentrated sulfuric acid. The acidified mash is then preferably heated and held at a temperature of from about 60 to 120° C. for a period of from one-half to two hours, depending upon the temperature employed, as a result of which the riboflavin remaining in the cells of the fungus is liberated. After this treatment, the mash is filtered by any convenient means, and the riboflavin present in the filtrate may be recovered therefrom in accordance with any of several known methods, for example, by adsorption on a suitable adsorbent material, such as fuller's earth or adsorbent clay. The resulting adsorbate can then be treated in known manner with a suitable elution solvent, as for example that described in U. S. Patent No. 2,175,014 of Booher et al., to obtain the riboflavin in a substantially pure state.

One of the most important and especially unpredictable phases of my invention, however, is the fact that I am able to obtain high yields of riboflavin by utilizing as a nutrient solution the residues (commonly known as "slops") from other industrial fermentation processes such as those employed for the production of ethyl and butyl alcohols. These large volumes of fermentation residues, which are substantially exhausted with respect to at least part of the nutrients required for the type of microorganic growth for which they have previously been utilized, have proved to be among the most efficient media I have been able to discover for use in the process of my invention and are capable of producing high yields of riboflavin without further dilution or concentration, although they are somewhat improved by the addition of readily available carbohydrates such as metabolizable sugars.

The nutrient mashes which can be fermented by the organism *Eremothecium Ashbyii*, to produce riboflavin, may vary widely in composition. Generally the proportion of proteinaceous material in the mash employed may range from about 10 to 90 per cent by weight of the total nutrients present therein and in this connection the expression proteinaceous material as used in the present description is intended to include proteins, denatured proteins, and their cleavage products. In addition to the need for such substances in the mash there must be also present in nutritive amounts a metabolizable carbohydrate. Therefore it is to be specifically understood that the expression "nutrient mash" appearing throughout the disclosure as well as in the appended claims is to be construed to mean a mash having present such constituents, i. e., proteins and metabolizable carbohydrates, in the proportions indicated immediately above.

Besides the class of raw materials obtainable as waste products of certain industrial fermentation processes, there are numerous other readily available substances which may be employed directly as the nutritive material for the organism without further addition of other nutrients. As examples of such materials there may be mentioned milk, whey, steep water, and mashes made from water and cereal grains, oil meals, and the seeds from a wide variety of leguminous plants, such as peas, soy beans, field beans and the like. Also numerous lipids when combined with the necessary amounts of protein such as for example, peptone or egg albumen, in the presence or absence of metabolizable carbohydrates, may be satisfactorily employed in preparing suitable nutrient mashes.

Examples of lipids metabolizable by the organism Eremothecium Ashbyii, are corn oil, lecithin, olive oil, peanut oil, cocoa butter, "Mazola" oil, and the like. Waste protein-containing materials such as tankage, fish meal, meat scrap, untreated hide scrap, etc., may likewise be successfully utilized in conjunction with carbohydrates such as the sugars, for example; glucose, sucrose, mannose, etc.

In general, the total nutrient content of the mash may vary from between about 0.5 to 9 per cent, depending on the composition of the particular mash utilized. Obviously it is desirable to employ mashes having the maximum initial concentration of nutrient substances that are practical under the circumstances, in order to conserve operating space and equipment. Mashes having a nutrient content appreciably in excess of 9 per cent, however, are generally not suited for satisfactory growth of the organism and hence from a practical standpoint, at least, are undesirable. For most purposes I prefer to employ mashes having an initial nutrient content of about 3 per cent, since mashes of such concentration seem to be favorable both from the standpoint of growth of the organism and relative amounts of riboflavin produced. In regard to the nutrient content of the mash, it should be understood, however, that since the amount of nutrient present decreases as the fermentation proceeds, the nutrient content may be intermittently increased to the original value by addition of the required nutrient substances as many times as may be found necessary or desirable under the circumstances.

Aeration of the mash during fermentation may be accomplished by any desired means, the chief requirements being that the air employed be sterile and that it be introduced in quantities and in a degree of dispersion sufficient for rapid growth of the fungus. I have found that under certain circumstances a combination of aeration and moderate mechanical agitation of the mash results in a much more rapid growth of the organism and hence a shorter fermentation time is thus made possible. This is particularly true when employing relatively small amounts of inoculum. With larger proportions of inoculum, however, I have found that a means of agitating the mash independent of the agitation produced by the introduction of air, is ordinarily unnecessary. In such instances, the air is preferably introduced through a dispersion unit, or series of such units, which causes the air to be divided into bubbles of small diameter. The rate at which aeration occurs may vary within relatively wide limits. In general, aeration rates of from about 0.5 to 5 cubic feet per minute per square foot of mash surface can be employed. For most fermentation operations, however, I prefer to introduce air in the aforesaid manner at a rate of from about 1.5 to 2 cubic feet per minute per square foot of mash surface. Although the above-mentioned methods of aerating the mash have been found particularly efficient when employing the customary fermentation procedures, it should be understood that I do not desire the term "aeration," appearing in the appended claims, to be restricted to such methods. For example, under certain circumstances ample aeration can be effected by shaking, stirring, or spraying the mash in the presence of an atmosphere of sterile air.

When an agitating means is desired, any of several standard designs, such as, for example, those of the rake or propeller type, will be found satisfactory. The type of agitation used, however, should be such that the organisms are not unduly macerated. The dispersion units employed may likewise be any of several different designs, although for fermentation vessels of the kind generally employed, I have found that units constructed of porous ceramic material are particularly suited for my purpose, the number of units utilized, of course, depending upon the volume of mash to be aerated and the form of the fermentation vessel.

The initial pH of the mash may range from between about 4.5 to 9.1. It has been observed, however, that mashes having a relatively low protein content may be adjusted to a comparatively high pH, although for the majority of mashes I generally prefer to employ an initial pH of between 5.1 to 6.5. Under normal conditions, for the first 20 to 24 hours of fermentation, the pH of the mash will frequently be observed to drop from 0.1 to 0.2 unit. After this initial drop, the pH of the medium increases. During the final stages of the process a pH value, generally lying between about 6.5 to 8.5, is reached.

In regard to initial pH, it may be said that many of the various raw materials, employed as the substrate for the fungus, possess pH values too low for satisfactory growth of the organism and require adjustment. Examples of such raw materials are the residues obtained from ethyl alcohol and butyl alcohol fermentations. The above disadvantages, however, may be satisfactorily overcome by the addition of a suitable alkaline substance to said raw materials, to bring the pH within the range desired for the initial stages of the fermentation. As examples of alkaline materials suitable for this purpose, there may be mentioned sodium carbonate, lime, calcium carbonate, and the like.

In general, the temperature at which fermentation may be effected can vary from about 15 to 40° C. However, I have found it preferable to employ temperatures of from 23 to 34° C. At temperatures below 15° C., the fermentation rate is reduced to such an extent that only negligible amounts of from about 200 to 20,000 μg. per gram peratures in excess of 40° C., the ability of the organism to produce riboflavin, is greatly impaired. The influence of temperature on riboflavin production is demonstrated by the data appearing in the table below. In these experiments the mash employed in all cases was a residue obtained from grain alcohol fermentation. In carrying out the determinations, 150 parts by volume of sterile mash was inoculated with 2 per cent by volume of an active culture of Eremothecium Ashbyii, and incubated for the time and at the temperature indicated. Aeration was effected by shaking the mash in an atmosphere of sterile air.

TABLE

| Temperature, °C. | Initial pH | Final pH | Time, hrs. | Yield of Riboflavin, μg./ml. |
|---|---|---|---|---|
| 20 | 5.5 | 7.3 | 89 | 139 |
| 25 | 5.5 | 7.7 | 89 | 323 |
| 29 | 5.5 | 8.1 | 89 | 282 |
| 32 | 5.1 | 7.5 | 72 | 205 |
| 35 | 5.1 | 7.32 | 72 | 141 |
| 37 | 5.5 | 8.1 | 70 | 82 |

The period required to carry fermentation to completion is, of course, dependent upon numerous factors such as temperature, the nutrient content of the particular mash fermented, percentage of inoculum, etc. Usually the fermentation is complete within about 50 to 90 hours after inoculation. However, in any given instance, this time may readily be ascertained by periodic assays of mash samples, for increasing riboflavin content.

Although it is not essential that the fermentation be carried out under super-atmospheric pressure, I have found it desirable in the majority of instances to do so, since such practice tends to substantially eliminate any possible contamination of the mash from the atmosphere. The pressure used will, of course, largely be determined by the structure of the fermenter. In most fermentations, however, I have found that gauge pressures of from 2 to 15 pounds, are satisfactory.

The inoculum containing the fungus, *Eremothecium Ashbyii*, may be prepared in accordance with a number of different methods. In general it may be said that at least one transfer from the stock to a suitable medium is required to produce an active culture. However, the number of such transfers will be found to ordinarily be dependent on the final quantity of inoculum necessary for satisfactory fermentation of the desired volume of mash.

Although the riboflavin present in the liquors resulting from my fermentation process may be recovered therefrom by means of any of several standard methods, some of which have been previously mentioned, a further advantage of my invention constitutes the fact that I am able to secure dried residues containing riboflavin in amounts of from about 200 to 20,000 μg. per gram of dried material, by concentrating said liquors in accordance with well established procedures. Care should be exercised, however, in the concentration step to avoid temperatures which would result in substantial destruction of the riboflavin activity of the resulting residue. Generally the residues, rich in riboflavin, can be secured by first concentrating the fermented liquor through evaporation such as, for example, by the use of a multiple effect evaporator, after which the resulting concentrate may be dried to a solid mass by evaporation in pans, or by the use of rotary drum driers, vacuum driers, spray driers, or the like. As an alternative method, the riboflavin rich liquor may be reduced to a solid form in a single form in a single step by spray evaporation. In general, it may be said that any of the common methods for recovering solids from liquids, which would not tend to adversely affect the riboflavin present therein, may be employed for this purpose. It will therefore be evident that the above-mentioned feature of my invention is capable of numerous modifications of procedure, the only essential requirement being that the recovery step is carried out in a manner not harmful to the riboflavin contained in the resulting residue.

In addition to the extremely high riboflavin content of the aforesaid residues, I have found that pantothenic acid, the factor necessary to prevent dermatitis in chicks, is also synthesized by the fungus *Eremothecium Ashbyii* and is present in said residues in comparatively high concentration, i. e., in amounts as high as 400 μg., and above, per gram of dried residue. Therefore, because of the high concentrations in which both riboflavin and pantothenic acid are present, such residues are highly useful in fortifying feeds or foodstuffs deficient in either or both of the above mentioned factors. It will likewise be apparent that these residues can be employed in the preparation of vitamin concentrates.

My invention may be more specifically illustrated by the examples which follow:

Example I

Three hundred and seventy-two gallons of mash consisting solely of thin grain alcohol fermentation residue, having been adjusted to an initial pH of 5.2, was introduced into a fermentation vessel 42 in. I. D., by 90 inches high, and sterilized for ninety minutes at 113° C. After sterilization, the mash was cooled to approximately 29° C. and inoculated with 2800 c. c. of an active culture of *Eremothecium Ashbyii*. Fermentation was permitted to take place at 29° C., with the introduction of sterile air, at a rate of 18 cubic feet per minute (measured at standard temperature and pressure) through a No. 4 Norton porous tube located at the bottom of the vessel near the center. The dimensions of this tube were: diameter 3 inches; wall thickness, ⅝ inch; length 24 inches; and average pore size, .09 mm. A positive operating pressure of 4 pounds per square inch was maintained, and for the first 48 hours the mash was agitated by means of a three blade propeller-type agitator, 14 inches in diameter, operating at 320 R. P. M., and located on the side of the vessel near the bottom. Thereafter, use of the agitator was discontinued. The fermentation was stopped 65 hours after inoculation, the pH of the mash being 7.2. The required amount of concentrated sulfuric acid was next added to reduce the pH of the mash to approximately 5.5. The resulting acidified liquor was then heated at about 100° C. for a period of about one hour to insure substantially complete liberation of the riboflavin from the fungus cells. The volume of the fermented mash was 342 gallons and on analysis showed riboflavin to be present in a concentration of 223 micrograms per c. c., equivalent to a total yield of .64 pound.

Example II

Three hundred and seventy-two gallons of mash, having been adjusted to an initial pH of 5.3 and consisting solely of thin grain alcohol fermentation residue, was introduced into a fermentation vessel of the same type and dimensions as described in Example I. After sterilization and inoculation, as set forth in Example I, with an active culture of *Eremothecium Ashbyii*, sterile air was next introduced at a rate of 18 cu. ft. per minute through two No. 4 Norton tubes of the dimensions described in Example I. A positive operating pressure of 15 pounds per square inch was maintained throughout the course of the fermentation, but no means of mechanical agitation was employed. The fermentation was stopped 87 hours after inoculation, the pH at this time being 6.9. The mash was then adjusted to a pH of 5.5 by the addition of concentrated sulfuric acid, and the resulting acidified liquor heated in the manner described in Example I. The volume of the fermented mash was 354 gallons and on analysis showed riboflavin to be present in a concentration of 239 micrograms per cc., corresponding to a total of .71 pound.

*Example III*

Three hundred and seventy-two gallons of a mash having an initial pH of 5.3 and consisting solely of thin grain alcohol fermentation residue, was introduced into a fermentation vessel of the same dimensions as described in Example I. After sterilization and inoculation, as described in Example I, with an active culture of *Eremothecium Ashbyii*, sterile air was introduced at the rate of 24 cu. ft. per minute through two No. 4 Norton tubes of the dimensions described in Example I. A positive operating pressure of 2 pounds per square inch was maintained throughout the fermentation. No means of mechanical agitation was employed. The fermentation was discontinued 87 hours after inoculation, the pH of the mash at this stage being 6.9. The resulting fermentation liquor, which amounted to 342 gallons, was then processed in the manner described in Example I, and analyzed for riboflavin. Results of the analysis showed riboflavin to be present in a concentration of 290 micrograms per cc., corresponding to a total of .83 pound.

*Example IV*

A mash having an initial pH of 5.4 and consisting of 372 gallons of thin grain alcohol fermentation residue and 11 pounds of high-test molasses was introduced into a fermentation vessel having the dimensions specified in Example I. After sterilization and inoculation, as described in Example I, with an active culture of *Eremothecium Ashbyii*, sterile air was introduced at a rate of 18 cu. ft. per minute through a No. 4 Norton tube having the previously specified dimensions. Throughout the fermentation an operating pressure of 8 pounds per square inch was maintained. For the first 40 hours an agitator of the type described in Example I was employed to promote more rapid growth of the organism. Thereafter, use of the agitator was discontinued. Eighty-nine hours after inoculation fermenation was stopped, the pH of the mash at this stage being 7.4. The required amount of concentrated sulfuric acid was then added to the mash to reduce the pH to approximately 5.5, after which it was processed in the manner described in Example I. The volume of the fermented mash was 336 gallons and was found to contain riboflavin in a concentration of 352 micrograms per c. c., equivalent to a total of .94 pound. Assay for pantothenic acid showed 27 µg. per ml.

*Example V*

A mash having an initial pH of 5.4 and consisting of eight pounds of glucose and 372 gallons of thin residue obtained from a whiskey fermentation using 70 per cent corn, 20 per cent rye, and 10 per cent malt, was introduced into a fermentation vessel of the type specified in Example I. After sterilization and inoculation of the mash with an active culture of *Eremothecium Ashbyii* had been carried out as described in Example I, sterile air was introduced at a rate of 18 cu. ft. per minute through a No. 4 Norton tube, having the dimensions previously specified. Throughout the fermentation a positive operating pressure of 2 pounds per square inch was maintained. After a period of 82 hours, fermentation was discontinued, the mash having a pH of 7.2 at this stage. The pH was then adjusted to 5.5, with concentrated sulfuric acid, and the mash processed in accordance with the procedure of Example I. The fermented liquor, which amounted to 342 gallons, was analyzed and riboflavin was found to be present in a concentration of 395 micrograms per cc., amounting to a total of 1.13 pounds.

*Example VI*

A mash having a pH of 5.8 and consisting of 10 pounds of corn steep water and 360 gallons of thin grain alcohol fermentation residue was introduced into a fermentation vessel having the dimensions specified in Example I. The mash was then sterilized and inoculated with an active culture of *Eremothecium Ashbyii* as described in Example I. Sterile air was next introduced at a rate of 18 cu. ft. per minute through two No. 4 Norton tubes of the type previously employed. Throughout the fermentation, an operating pressure of 8 pounds per square inch was maintained. For the first 40 hours an agitator of the design described in Example I was employed. Thereafter, use of the agitator was discontinued. For the remainder of the fermentation adequate agitation was provided by the introduction of air into the mash at the aforesaid rate. At the end of 42 hours, 8 pounds of glucose was added to the mash, while an additional 8 pounds was introduced after 73 hours. Fermentation proceeded for a total of 98 hours and at the expiration of this period the process was discontinued, the pH of the resulting liquor being 7.5. This liquor was then adjusted to a pH of 5.5 in the usual manner with concentrated sulfuric acid, after which it was processed in accordance with the method described in Example I. The final volume of fermented mash was 318 gallons and on analysis riboflavin was shown to be present in a concentration of 436 micrograms per c. c., corresponding to a total yield of 1.15 pounds. Assay for pantothenic acid showed 26 µg. per ml.

*Example VII*

A mash having an initial pH of 5.2 and consisting of 8000 gallons of thin grain alcohol fermentation residue was introduced into a fermenter having a hemispherical bottom and an elliptical top. This fermenter was 12.5 ft. in diameter and the height of the cylindrical portion thereof was 6.75 ft. After sterilization and inoculation of the mash in the manner described in Example I, sterile air was introduced for the first 24 hours at a rate of 180 cu. ft. per minute and thereafter at a rate of 210 cu. ft. per minute through twelve No. 4 Norton Tubes of the type specified in Example I. These tubes were placed near the bottom of the fermenter in such a manner as to promote uniform aeration of the mash. An operating pressure of 8 pounds per square inch was employed during the fermentation. Seventy-four hours after inoculation, fermentation was discontinued, the final pH of the liquor at this stage being 7.1. The required amount of concentrated sulfuric acid was next added to reduce the pH of the mash to approximately 5.5 after which it was maintained at a temperature of approximately 90° C. for a period of about one hour to establish complete liberation of riboflavin from the cells of the fungus. From this point on, the mash was processed in the manner described in Example I. The fermented liquor, which amounted to 7,500 gallons, was found to contain 303 micrograms of riboflavin per cc., amounting to a total yield of 18.90 pounds.

In another series of experiments, various carbohydrates and/or nitrogen-containing materials were added to distilled water in amounts varying from 2.25 to 3.0 grams per 100 cc. To materials high in protein but low in carbohydrates, small amounts of glucose were added. The resulting mixture was then adjusted to a definite initial pH and sterilized for about 45 minutes at 15 pounds gauge pressure, after which the mash was cooled to room temperature and the pH adjusted. The mash was next treated for 16 hours under toluene with 0.6 gram per liter of a mixed enzyme preparation from *Aspergillus Oryzae* commonly known as "Clarase." At the conclusion of the 16 hour period the pH was again determined and the mash steamed to remove the toluene. This mixture was then autoclaved for 45 minutes at 15 pounds gauge pressure, cooled to 30° C., and inoculated with 0.7 per cent of an active culture of *Eremothecium Ashbyii*. The depth of the mash in the fermentation vessel was ½ inch, an atmosphere of sterile air being maintained thereover at all times. The vessel was placed on a shaker and agitated in order to secure abundant aeration of the mash, and incubated for 90 hours at 29° C. All whole grains employed in the fermentation were ground in an Abbe mill. The results appearing below in tabular form were obtained.

TABLE

| Raw Material | Grams/ 100 cc. | Glucose grams/ 100 cc. | Initial pH | Final pH | Riboflavin µg./cc. |
|---|---|---|---|---|---|
| Meat scraps | 2.25 | .75 | 6.5 | 7.6 | 138 |
| Hard red wheat | 3.0 | | 6.5 | 7.6 | 158 |
| Tankage | 2.25 | .75 | 6.5 | 7.6 | 162 |
| Ground field beans | 3.0 | | 5.5 | 8.1 | 170 |
| Corn gluten meal | 3.0 | | 6.5 | 7.1 | 140 |
| Peas | 3.0 | | 6.5 | 7.8 | 180 |
| Soybean meal | 3.0 | | 6.5 | 7.8 | 130 |
| Cotton seed meal | 3.0 | | 6.5 | 7.6 | 105 |
| Fish meal | 2.25 | .75 | 6.5 | 7.9 | 225 |
| Wheat middlings | 3.0 | | 6.5 | 7.6 | 214 |
| Linseed oil meal | 3.0 | | 6.5 | 8.0 | 118 |
| Dried yeast | 3.0 | | 6.5 | 7.6 | 207 |
| Skim milk (hand skimmed) | | | 7.0 | 7.5 | 406 |
| Commercial skim milk (liquid) | | | 7.0 | 7.7 | 250 |

It is to be specifically understood, of course, that the above examples are merely illustrative, and are to be in no way considered limitative. For instance, although a relatively limited number of carbohydrate protein-containing mashes have been disclosed in the above series of examples, it should be understood that I may employ any mash containing a metabolizable carbohydrate, and having protein present in a concentration of about 10 to 90 per cent by weight of the nutrients contained therein. If mashes other than those of the type specifically mentioned are utilized, one skilled in the art may readily make the necessary adjustments to approximate the composition of the mashes described above. Also, it will be apparent to those skilled in the art that various modifications in temperature, pressure, and pH, as well as other factors, may be introduced without departing from the scope of my invention.

My invention having been described, what I claim is:

1. In a process for the production of riboflavin, the steps which comprise subjecting a nutrient mash to the action of an active culture of the fungus *Eremothecium Ashbyii*, introducing large volumes of air into the mash, and dispersing the same, together with the fungus, throughout the mash.

2. In a process for the production of riboflavin, the steps which comprise subjecting a nutrient mash to the action of an active culture of the fungus *Eremothecium Ashbyii*, and maintaining the mash in a state of aeration and agitation by the combined action of mechanical agitation and a current of air.

3. In a process for the production of riboflavin, the steps which comprise subjecting a nutrient mash to the action of an active culture of the fungus *Eremothecium Ashbyii*, under superatmospheric pressure, and maintaining said mash in a state of aeration and agitation sufficient to disperse said fungus and air throughout the mash.

4. In a process for the production of riboflavin, the steps which comprise subjecting a nutrient mash to the action of an active culture of the fungus *Eremothecium Ashbyii*, and introducing air into said mash at a rate of between about 0.5 to 5 cubic feet per minute per square foot of mash surface.

5. In a process for the production of riboflavin, the steps which comprise subjecting a nutrient mash to the action of an active culture of the fungus *Eremothecium Ashbyii*, under a gauge pressure of from 2 to 15 pounds, and maintaining said mash in a state of aeration sufficient to disperse the fungus and air throughout the mash.

6. In a process for the production of riboflavin, the steps which comprise subjecting a nutrient mash to the action of an active culture of the fungus *Eremothecium Ashbyii*, under superatmospheric pressure, at a temperature of from 15 to 40° C., and maintaining said mash in a state of aeration sufficient to disperse the fungus and air throughout the mash.

7. In a process for the production of riboflavin, the steps which comprise subjecting a nutrient mash to the action of an active culture of the fungus *Eremothecium Ashbyii*, under a pressure of from 2 to 15 pounds per square inch, at a temperature of from 23 to 34° C., and maintaining said mash in a state of aeration sufficient to disperse the fungus and air throughout the mash.

8. In a process for the production of riboflavin, the steps which comprise adjusting the pH of a nutrient mash to a value of between 4.5 and 9.1, subjecting said mash to the action of an active culture of the fungus *Eremothecium Ashbyii*, under superatmospheric pressure, at a temperature of from 15 to 40° C., and maintaining said mash in a state of aeration sufficient to disperse said fungus and air throughout the mash.

9. In a process for the production of riboflavin, the steps which comprise adjusting the pH of a nutrient mash to a value of between about 4.5 and 9.1, subjecting said mash to the action of a culture of the fungus *Eremothecium Ashbyii*, under superatmospheric pressure, at a temperature of from 15 to 40° C., and aerating said mash at a rate of from about 0.5 to 5 cubic feet per minute per square foot of mash surface.

10. In a process for the production of riboflavin, the steps which comprise adjusting the pH of a nutrient mash to a value of between about 5.1 and 6.5, subjecting said mash to the action of a culture of the fungus *Eremothecium*

*Ashbyii* under superatmospheric pressure, at a temperature of from 23 to 34° C., and aerating said mash at a rate of from about 1.5 to 2 cubic feet per minute per square foot of mash surface.

11. In a process for the production of riboflavin, the steps which comprise adjusting the pH of a nutrient mash to a value of between about 5.1 and 6.5, subjecting said mash to the action of a culture of the fungus *Eremothecium Ashbyii*, under superatmospheric pressure, at a temperature of from 23 to 34° C., and maintaining said mash in a state of aeration sufficient to disperse said fungus and air throughout the mash.

12. In a process for the production of riboflavin, the steps which comprise adjusting the pH of a nutrient mash to a value of between about 5.1 and 6.5, subjecting said mash to the action of an active culture of the fungus *Eremothecium Ashbyii*, under a pressure of from 2 to 15 pounds per square inch, at a temperature of from 23 to 34° C., and maintaining said mash in a state of aeration sufficient to disperse said fungus and air throughout the mash.

13. A process for the production of highly concentrated solutions of riboflavin, which comprises inoculating a nutrient mash with an active culture of the fungus *Eremothecium Ashbyii*, and maintaining the fungus in substantially uniform dispersion throughout the mash and in intimate contact with air during the fermentation.

14. A process adapted for large-scale production of riboflavin, which comprises inoculating a mass of a nutrient mash of substantial depth and having a pH of between about 4.5 and 9.1, with an active culture of *Eremothecium Ashbyii*, maintaining such culture in substantially uniform dispersion throughout the medium and in intimate contact with oxygen while holding the temperature of the mass between about 15 and 40° C.

15. A process adapted for large-scale production of riboflavin, which comprises inoculating a mass of a nutrient mash of substantial depth and having a pH of between about 5.1 and 6.5, with an active culture of *Eremothecium Ashbyii*, maintaining such culture in substantially uniform dispersion throughout the medium and in intimate contact with oxygen while holding the temperature of the mass between about 23 and 34° C.

16. In a process for the production of riboflavin, the steps which comprise subjecting a mash, consisting essentially of the residues obtained from ethyl alcohol fermentation, to the action of an active culture of the fungus *Eremothecium Ashbyii*, and maintaining said mash in a state of aeration sufficient to disperse the fungus and air throughout the mash.

17. In a process for the production of riboflavin, the steps which comprise subjecting a mash, consisting essentially of milk, to the action of an active culture of the fungus *Eremothecium Ashbyii*, and maintaining said mash in a state of aeration sufficient to disperse the fungus and air throughout the mash.

18. In a process for the production of riboflavin, the steps which comprise subjecting a mash in which the nutrients consist essentially of waste proteinaceous material protein and a metabolizable carbohydrate, to the action of an active culture of the fungus *Eremothecium Ashbyii*, and maintaining said mash in a state of aeration sufficient to disperse the fungus and air throughout the mash.

19. In a process for the production of riboflavin, the steps which comprise subjecting a nutrient mash to the action of an active culture of the fungus *Eremothecium Ashbyii*, maintaining the mash in a state of aeration sufficient to disperse the fungus and air throughout the mash, and heating the resulting fermented mash to release the synthesized riboflavin present in the cells of said fungus.

20. In a process for the production of riboflavin, and panthothenic acid, the steps which comprise frementing a nutrient mash with an active culture of the fungus *Eremothecium Ashbyii*, and maintaining the mash in a state of aeration sufficient to disperse the fungus and air throughout the mash.

21. The process of claim 20, whereby the yield of riboflavin produced is increased by the addition of a metabolizable carbohydrate to the nutrient mash.

22. The process of claim 16, whereby the yield of riboflavin is increased by the addition of a metabolizable carbohydrate to the nutrient mash.

23. The process of claim 16, whereby the yield of riboflavin is increased by the addition of glucose to the nutrient mash.

24. A process for the production of riboflavin which comprises subjecting a liquid nutrient medium to the action of *Eremothecium Ashbyii* while agitating and maintaining the medium in a state of aeration.

HUGH R. STILES.

REFERENCES CITED

The following references are of record in the file of this patent:

UNITED STATES PATENTS

| Number | Name | Date |
| --- | --- | --- |
| 2,128,845 | Myers | Aug. 30, 1938 |
| 2,202,161 | Miner | May 28, 1940 |

OTHER REFERENCES

Raffy, "Comptes Rendus," Tome 205 (1937), pages 1005–1006.

Miramanoff et al., "Chemical Abstracts," vol. 33, 1939, page 1355.

Certificate of Correction

Patent No. 2,483,855

October 4, 1949

HUGH R. STILES

It is hereby certified that errors appear in the printed specification of the above numbered patent requiring correction as follows:

Column 3, line 29, for the word "are" read *is*; line 47, for "may", first occurrence, read *many*; column 4, line 61, strike out "from about 200 to 20,000 µg. per gram" and insert instead *riboflavin are produced, while at tem-*; column 5, line 65, strike out "single form in a"; column 9, in the table, fourth column thereof, for "5.5" read *6.5*; column 10, line 55, after "between" insert *about*;

and that the said letters Patent should be read with these corrections therein that the same may conform to the record of the case in the Patent Office.

Signed and sealed this 11th day of April, A. D. 1950.

[SEAL]

THOMAS F. MURPHY,
*Assistant Commissioner of Patents.*